Nov. 4, 1924.
O. R. BRINEY
PLUG GAUGE
Original Filed June 14, 1922
1,514,250
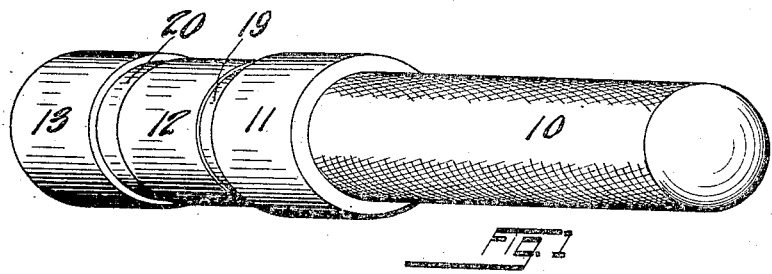
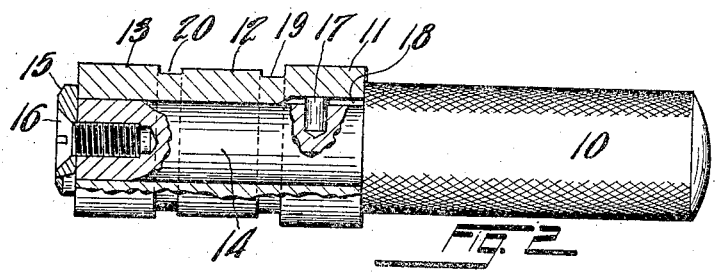
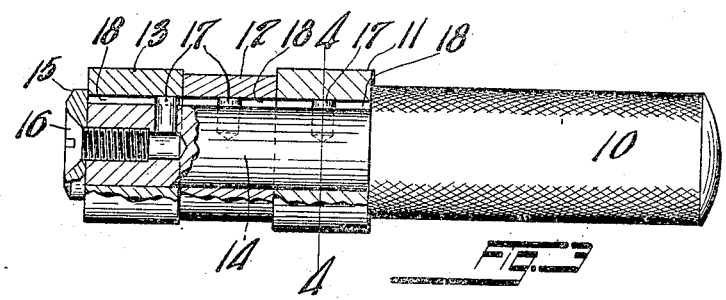
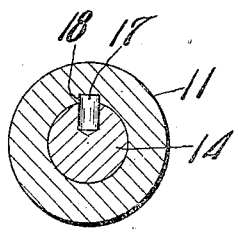
INVENTOR
Ottis R. Briney.
BY
C. T. Heinkel,
ATTORNEY Patented Nov. 4, 1924.

1,514,250

UNITED STATES PATENT OFFICE.

OTTIS R. BRINEY, OF PONTIAC, MICHIGAN.

PLUG GAUGE.

Continuation of application Serial No. 568,327, filed June 14, 1922. This application filed June 15, 1923. Serial No. 645,485.

*To all whom it may concern:*

Be it known that I, OTTIS R. BRINEY, a citizen of the United States, residing at Pontiac, county of Oakland, and State of Michigan, have invented a new and useful Improvement in Plug Gauges, of which the following is a specification.

The present application is a division of my former application for plug gauges filed June 14, 1922, Serial No. 568,327.

My invention relates to plug gauges for gaging holes.

The main object of my invention is a simple and efficient plug gauge, which has all of the gauge members on one side of a handle to save time in its use and which checks itself during its regular use. Other objects will appear during the description of the gauges shown in the accompanying drawing.

Plug gauges, generally, have gauge members on each end of the handle portion thereof. During the use of these gauges, it is necessary for the operator to reverse the gauge at each testing of a hole. Such reversal requires time and delays production. Another time consuming feature of these former gauges is that the operator must periodically return them to the tool room or other checking station to have them checked to determine whether they are not worn below allowed size.

The present invention aims to provide a gauge which checks itself while it is in use by the operator, which eliminates the reversal thereof now required while in use, and which eliminates the time now required to check the gauge.

I attain my objects by the mechanism shown in the accompanying drawing in which Fig. 1 is a general perspective view of a plug gauge made according to my invention, and made all in one piece; Fig. 2 is a side view, partly in section, of a plug gauge made according to my invention and showing renewable gauge members; Fig. 3 is a side view, partly in section, of a plug gauge made according to my invention and showing each of the gauge members individually renewable; Fig. 4 is a section on line 4—4 of Fig. 3 showing the key means between the body and the gauge members.

Similar reference numerals refer to similar parts throughout the views.

As is well known in the art, present manufacturing requires quantity production with certain limitations as to the sizes of the parts. Therefore, gauges are provided which have gauge members for high and low limits.

The plug gauge shown in Fig. 1 has a body comprising the handle 10, the high limit measuring gauge 11, the check gauge 12, and the low limit measuring gauge 13. In this instance, the gauge members are formed directly on the body of the plug gauge.

To facilitate the understanding of the relations between the sizes of the gauge members, it is assumed that the hole to be gaged is 1″ in diameter normally, and that this hole may be as small as 0.999″ in diameter, and that it may be as large as 1.005″ in diameter.

In the above instance, the high limit measuring gauge 11 should be made slightly larger than 1.005″ so that this portion of the gauge does not enter the hole unless that hole is oversize.

The low limit measuring gauge 13 should be made 0.999″ so that the low limit gauge does enter such hole as long as the hole is not below size.

The check gauge 12 is made very slightly smaller than 0.999″ so that this gauge also enters the hole if the low limit gauge 13 does.

Therefore, when measuring such hole with the gauge described, the hole will be within required limits as long as the low limit gauge enters the hole but the high limit gauge does not.

Since the low limit gauge enters and is moved, rotatively and longitudinally, in a large number of holes, it necessarily wears and eventually gets under size.

The check gauge 12 should be made very slightly smaller than 0.999″ in diameter so that this gauge can pass through the hole if the gauge 13 does.

When using this gauge, the hole gaged is correct as long as the gauges 12 and 13 pass through and the gauge 11 does not. However, when the gauge 13 passes through the hole and the gauge 12 does not, it shows the operator then and there that the low limit measuring gauge is worn below size without resorting to any other checking or testing means.

The plug gauge shown in Fig. 2 has the same features as the one shown in Fig. 1 except that the gauge members are formed of a separate piece of material which is mounted on the reduced end 14 and is held thereon, endwise, by the washer 15 and the screw 16. The pin 17 is driven into the reduced end 14 and extends beyond the outer circumference thereof to form a key. The gauge member has the key way 18 engaging the pin 17 to prevent rotation of the gauge member on the reduced end 14.

The relief grooves 19 and 20 are provided to facilitate grinding of the gauges.

The plug gauge shown in Figs. 3 and 4 has the same features as the ones shown in Figs. 1 and 2 except that the gauges are formed as separate units and are mounted on the reduced end 14. The washer 15 and the screw 16 hold them thereon endwise, while the pins 17 and the key ways 18 (duplicates of Fig. 2) prevent rotation thereof as explained in connection with Fig. 2.

The plug gauge shown in Figs. 3 and 4 has the additional advantage of requiring only the renewal of those gauges which are worn below size.

The operation of the plug gauges shown in Figs. 2, 3, and 4 is similar to that shown in Fig. 1.

As seen in the specification and in the drawing, the present invention provides a plug gauge having a check member or check gauge in combination with limit gauges to automatically check the latter while the plug gauge is in operation; and all of the gauges are on one side of a handle to save time in operation; and either one of the gauges may be renewed when worn or when a different size is desired.

I claim:—

1. A plug gauge including, a handle, a measuring gauge on one end of said handle and corresponding in diameter to the normal diameter of a hole to be gaged, and a check gauge adjacent to and inward of said measuring gauge and corresponding in diameter to the lowest permissible diameter of said hole.

2. A plug gauge including, a handle, a measuring gauge on one end of said handle and corresponding in diameter to the low normal diameter of a hole to be gaged, a check gauge adjacent to and inward of said measuring gauge and corresponding in diameter to the lowest permissible diameter of said hole, and a measuring gauge adjacent to and inward of said check gauge and corresponding in diameter to the largest permissible diameter of said hole.

3. In a plug gauge, the combination of, a handle having a reduced end, a measuring gauge on the end of said reduced end for measuring a hole, a check gauge on said reduced end adjacent to and inward of said measuring gauge to show by nonentrance thereof into said hole that said measuring gauge has worn below permissible size, and means for nonrotatably holding said gauges on said reduced end.

4. In a plug gauge, the combination of, a handle having a reduced end, a low limit measuring gauge on the end of said reduced end for measuring a hole for low limit, a check gauge on said reduced end adjacent to and inward of said low limit measuring gauge to show by nonentrance thereof into said hole that said low limit measuring gauge has worn below permissible size, a high limit measuring gauge on said reduced end adjacent to and inward of said check gauge for measuring said hole for high limit, and means for nonrotatably holding said gauges on said reduced end.

5. In a plug gauge, the combination of, a handle having a reduced end provided with a pin to act as a key, a low limit measuring gauge on the end of said reduced end for measuring a hole for low limit, a check gauge on said reduced end adjacent to and inward of said low limit measuring gauge to show by nonentrance thereof into said hole that said low limit measuring gauge has worn below permissible size, a high limit measuring gauge on said reduced end adjacent to and inward of said check gauge for measuring said hole for high limit, said gauges provided with a key-way to engage said pin, a washer on the end of said reduced end to hold said gauges on said reduced end, and a screw threaded into the end of said reduced end to hold said washer in position.

OTTIS R. BRINEY.